April 1, 1924.
G. H. CRAWFORD
ANIMAL TRAP
Filed Dec. 16, 1921
1,488,475
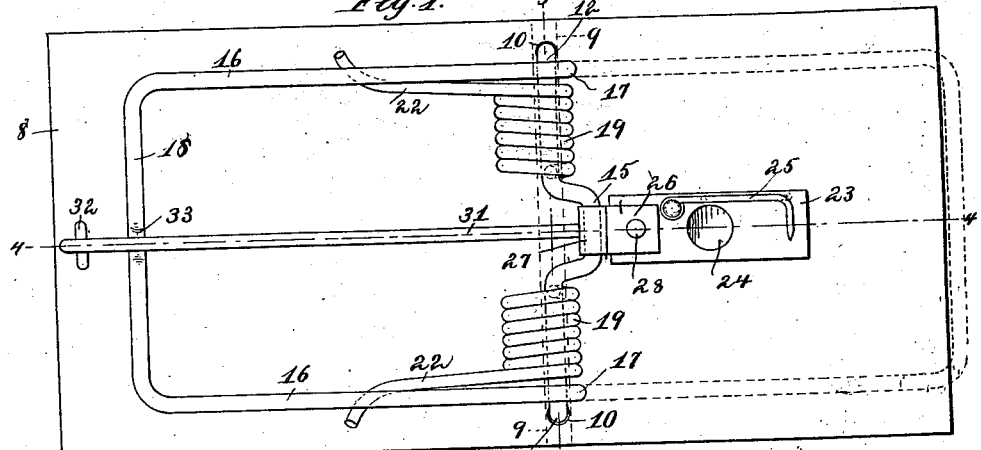
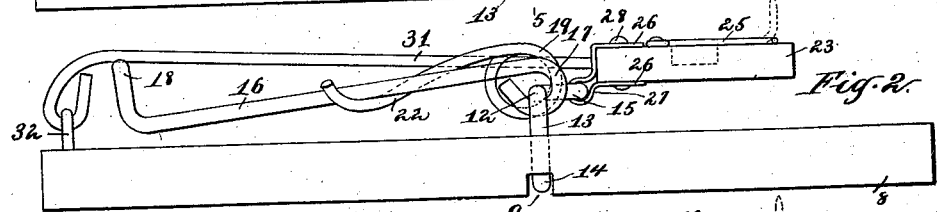
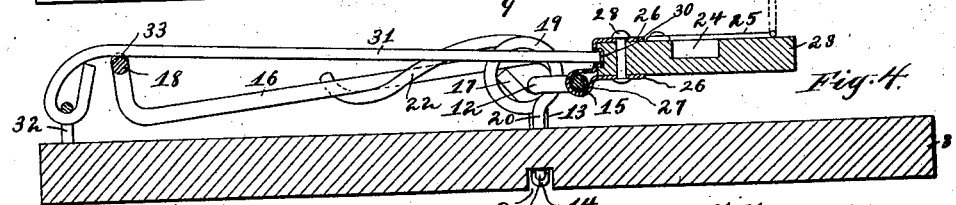
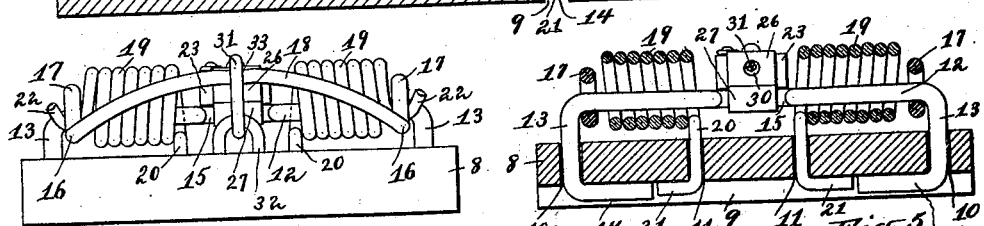
Inventor:
George H. Crawford,
by his attorney
Charles R. Searle.

Patented Apr. 1, 1924.

1,488,475

UNITED STATES PATENT OFFICE.

GEORGE H. CRAWFORD, OF MIDDLETOWN, NEW YORK.

ANIMAL TRAP.

Application filed December 16, 1921. Serial No. 522,838.

*To all whom it may concern:*

Be it known that I, GEORGE H. CRAWFORD, a citizen of the United States, residing at Middletown, in the county of Orange and State of New York, have invented a certain new and useful Improvement in Animal Traps, of which the following is a specification.

The invention relates to traps of the striking or deadfall class, and it is more particularly designed for catching rats and other small animals.

The object of the invention is to provide a trap of this character which shall be extremely sensitive and reliable in operation, and of few parts economically manufactured and easily assembled.

The invention consists in certain details of construction and arrangements of parts by which the above objects are attained, to be hereinafter described and claimed.

The accompanying drawings form a part of this specification, and show the invention as it has been carried out in practice.

Figure 1 is a plan view of the improved trap, in the set condition.

Figure 2 is a side view of the same.

Figure 3 is a corresponding end view.

Figure 4 is a vertical longitudinal section taken on the line 4—4 in Figure 1, and partly in elevation.

Figure 5 is a vertical transverse section taken on the line 5—5 in Figure 1, and partly in elevation.

Figure 6 is a vertical section through a portion of the trigger mechanism detached from the trigger and on a larger scale.

Figure 7 is a similar view showing the corresponding portion of the trigger.

Similar reference numerals indicate the same parts in all the figures.

Referring to the drawings, 8 is the base of the trap, preferably a plane rectangle of hard wood, formed by suitable machinery with a transverse groove 9 across the under face near the midlength, and with holes 10 near the side margins leading from the upper face to the groove. Similar but smaller holes 11 are provided nearer the centre line of the base.

In line with the groove 9 and above the upper face of the base, is a holder or bridge 12 of heavy wire having legs 13 extended through the marginal holes 10 and folded inwardly within the groove at 14 to resist withdrawal. At the midlength the bridge is offset horizontally at at 15 to form angular shoulders.

The striker 16 is a rectangular loop having its ends 17 bent to inclose the outer portions of the bridge at opposite points near the legs 13 to form hinge joints upon which the striker may be folded upon the base at one end of the latter in the "set" position and folded upon the base at the other end in the "sprung" position as indicated by dotted lines in Figure 1. In the latter position the arched connecting member 18 of the striker extends slightly beyond the base.

Between the shoulders of the offset 15 and the arms of the striker, on each side, is a helical torsional wire spring 19 inclosing the bridge 12 and each having a leg 20 extending downwardly from the inner end of the helix through one of the intermediate holes 11 into the groove 9 where it is bent at 21 to engage the base and offer a fixed anchor for the spring. The other end of each spring is continued as an arm 22 alongside the adjacent member 16 of the striker for a portion of its length, and in the set position its outwardly curved end lies beneath such member, so that the force of the springs tends to throw the striker from the set position shown, to the sprung position indicated by the dotted lines in Figure 1.

On the bar of the offset 15 is loosely hinged a trigger 23 preferably of hard wood, adapted to carry bait either in a cavity 24 therein, or on a hook 25 to be described. The trigger is hinged to the offset by a strip 26 of sheet metal lying upon the upper face of the trigger, extending down the end adjacent to the offset and encircling the bar, as at 27 to form the hinge therewith, and thence upon the lower face of the trigger and is secured to the latter by a rivet 28 extending through the trigger and the ends of the strip.

At the centre in the hinged end of the trigger is a recess 29 receiving a boss 30 on the strip and is reinforced thereby, serving to engage detachably the free end of a trigger-rod 31 of wire hinged to a staple 32 at one end of the base on the centre line, which when thus engaged holds the striker down in the set position. The trigger-rod lies in a slight depression 33 in the arched member 18 of the striker.

In setting the trap the trigger-rod is thrown back and the striker folded down in opposition to the force of the springs 19, and the trigger-rod thrown forward and pressed downwardly to hold the striker while the trigger 23 is raised and the end of the trigger-rod inserted in the boss 30. The upward thrust of the striker tends to lift the trigger and thus maintains the delicate engagement of the trigger-rod therewith, but as the boss 30 is close to and a little above the hinge of the trigger, an exceedingly slight pressure upon the trigger draws the boss from the trigger-rod, frees the latter and permits the springs 19 to throw the striker into the sprung position.

It will be noted that the several parts are designed to be economically produced by machinery and are easily assembled. The bridge 12 serves as a centre for the striker and holds the springs in place laterally between the striker arms and offset 15, and the offset serves as a centre for the trigger and maintains the latter in position. The trigger-rod is secured to the base by simply driving the staple 32. By engaging the legs 13 of the bridge, and the legs 20 of the springs, in the groove 9, the legs are securely held and do not project on the under face of the base, thus permitting the base to be plane and lie firmly upon any flat surface.

The hook 25 is pivotally attached to the trigger on the upper face with its bait-arm lying in the same plane for convenience in packing, and is to be bent up as shown in dotted lines to hold bait not adapted to be received in the cavity 24.

By lining the recess 29 with the hollow boss 30 of the strip 26, the recess is adapted to withstand wear, and the contact of the end of the trigger-rod with the metal of the boss is nearly frictionless in respect to the release movement thus rendering the release action extremely sensitive.

I claim:—

1. In a device of the character set forth, a base having a groove in its under face and marginal holes extending from the upper face into such groove, a bridge on such upper face having legs extending through such holes with their ends bent to lie in such groove, a striker mounted to swing on said bridge, and means for actuating said striker.

2. In a device of the character set forth, a base having a groove in its under face and marginal and intermediate holes extending from such upper face into such groove, a bridge on such upper face having legs extending through such marginal holes with their ends bent to lie in such groove, a striker mounted to swing on said bridge, helical springs inclosing said bridge and having legs extending through such intermediate holes with their ends bent to lie in such groove, and arms on said springs engaged with said striker.

3. In a device of the character set forth, a base, a bridge thereon having downwardly extending legs and an offset portion, a striker having its ends pivotally joined to said bridge adjacent said legs, oppositely located helical springs inclosing said bridge and arranged to actuate said striker, each spring lying between said offset and one of said striker-ends, a trigger hinged to said offset and supported entirely thereby, and a trigger-rod adapted to engage said trigger.

4. In a device of the character set forth, a base having a transverse groove in its under face and marginal and intermediate holes extending from the upper face into such groove, a bridge on such upper face having downwardly projecting legs extending through such marginal holes and engaged in such groove, a central offset portion in said bridge, a striker having its ends pivotally joined to said bridge adjacent said legs, oppositely located helical springs inclosing said bridge and arranged to actuate said striker, each spring lying between said offset and one of said striker-ends and each having a leg extending through one of such intermediate holes and engaged in such groove, and a trigger-rod adapted to engage said trigger.

In testimony that I claim the invention above set forth I affix my signature, in presence of two witnesses.

GEORGE H. CRAWFORD.

Witnesses:
E. T. HANFORD,
H. M. CRAWFORD.